R. S. BRYANT.
RIM FOR VEHICLE WHEELS.
APPLICATION FILED NOV. 20, 1912.
1,288,823.
Patented Dec. 24, 1918.
2 SHEETS—SHEET 1.
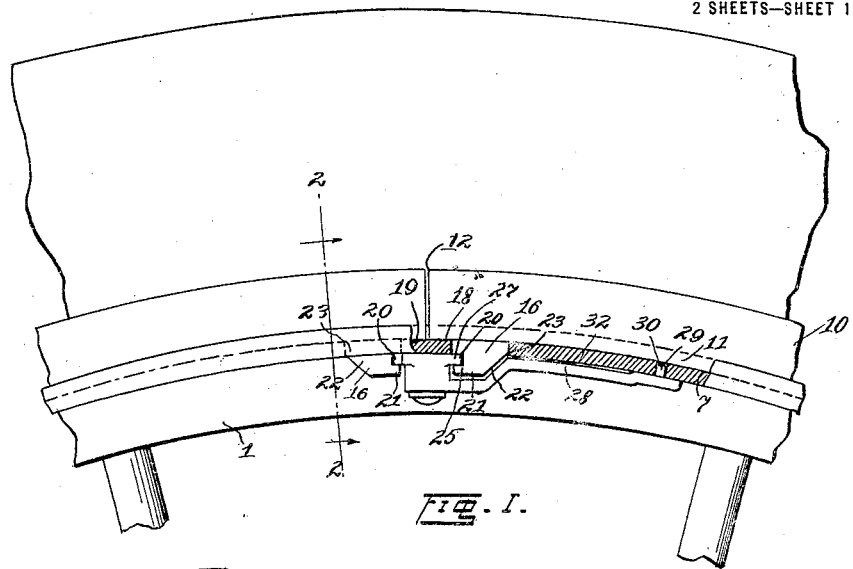
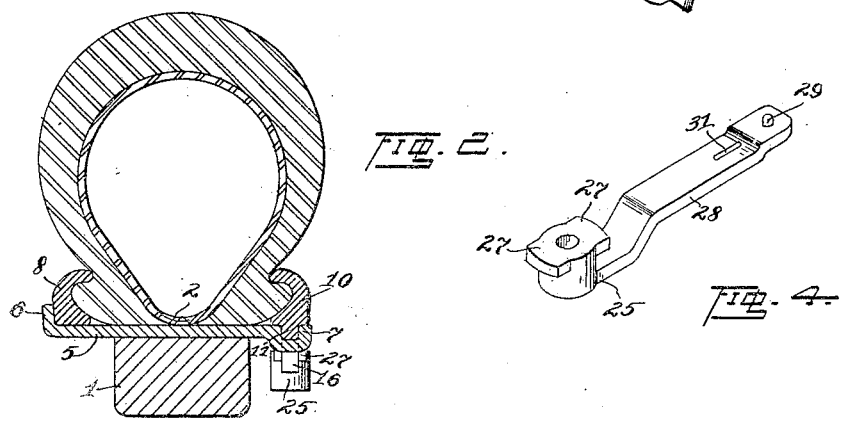
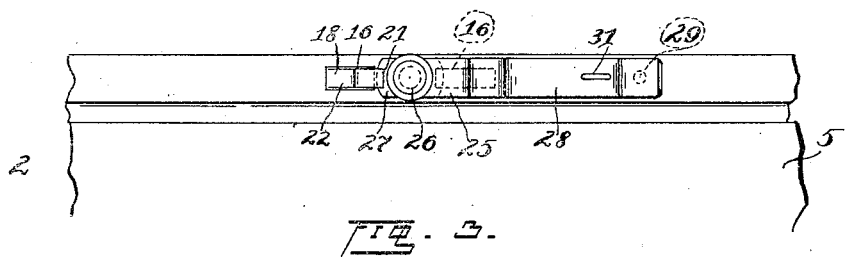
Witnesses:
R. L. Bruck.
Inventor.
Richard S. Bryant,
By Hull & Smith
Attys.

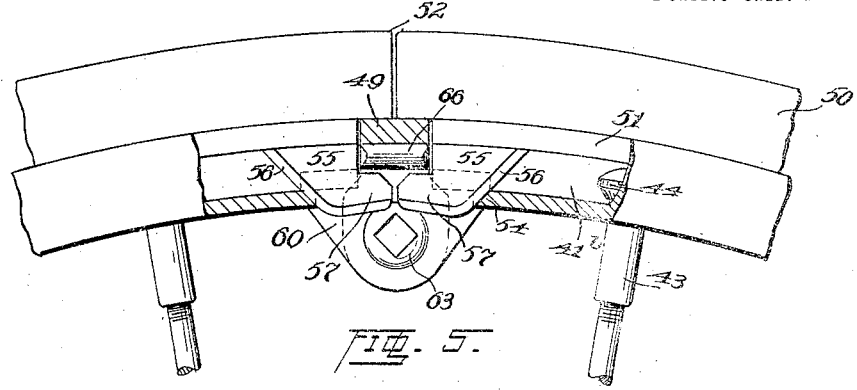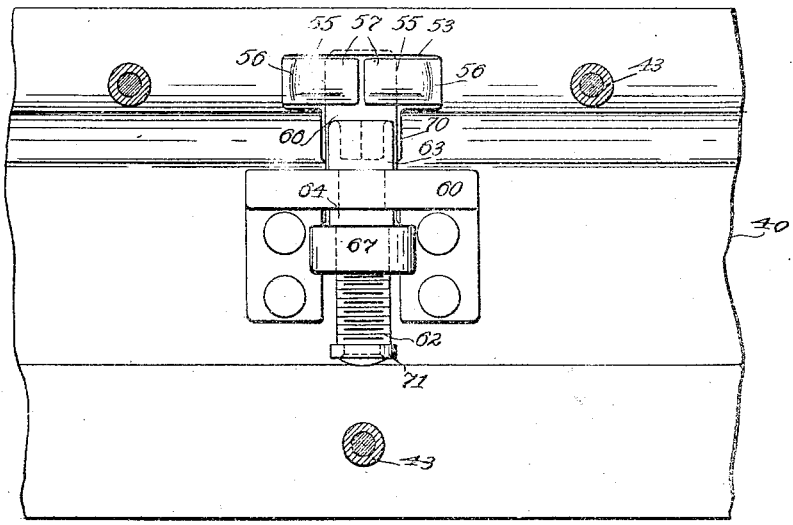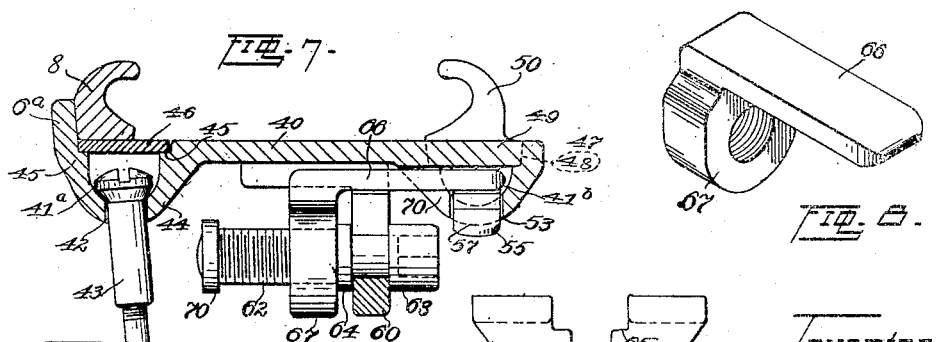

UNITED STATES PATENT OFFICE.

RICHARD S. BRYANT, OF CLEVELAND, OHIO, ASSIGNOR, BY MESNE ASSIGNMENTS, TO THE STANDARD PARTS COMPANY, OF CLEVELAND, OHIO, A CORPORATION OF OHIO.

RIM FOR VEHICLE-WHEELS.

1,288,823.

Specification of Letters Patent.

Patented Dec. 24, 1918.

Continuation in part of application filed April 25, 1912, Serial No. 693,078. This application filed November 20, 1912. Serial No. 732,502.

*To all whom it may concern:*

Be it known that I, RICHARD S. BRYANT, a citizen of the United States, residing at Cleveland, in the county of Cuyahoga and State of Ohio, have invented a certain new and useful Improvement in Rims for Vehicle-Wheels, of which the following is a full, clear, and exact description, reference being had to the accompanying drawings.

This invention relates to rims for vehicle wheels of the type designed to secure a pneumatic or other resilient tire in place thereon, in a manner to permit the ready removal of the same therefrom for purposes of repair or replacement. It has hitherto been proposed to provide a rim of generally channel shape for the reception of the tire, one of the flanges of the channel being removable so as to permit the tire to be displaced laterally therefrom without material obstruction. Great difficulty has hitherto been experienced, however, in devising a method of securing this flange to the remainder of the rim in such manner that it shall be rigidly and reliably attached thereto under all conditions of service and yet be readily removable therefrom when occasion demands. Likewise it is necessary that the securing means be of a simple and compact nature, not liable to be injured by jars, shocks, contact with road obstructions or street curbs or by corrosion, freezing, or sand abrasion.

The objects of this invention are the provision of novel and simplified mechanism for the secure attachment of this detachable flange to the side of the wheel rim; the provision of attaching means which may be readily disconnected when occasion shall arise without the employment of any special tools other than those which the operator always possesses, and which shall be proof against accidental disconnection or against being rendered inoperative by rust, dirt, ice, or other foreign matter; the provision of securing means having all of its parts permanently attached either to the rim or to the flange so that there shall be nothing which can be lost or mislaid; the provision of attaching means which, while perfectly secure under all conditions of use, will offer the least possible obstruction to the removal of the flange; the provision of securing means which shall permit the reversal of the flange so as to permit tires of different shape to be employed; while further objects and advantages of the invention will become apparent in the course of the following description and claims.

More specifically this application is in part a continuation of my copending application filed April 25, 1912, Serial No. 693,078 to which copending application reference is hereby made as to all common subject matter, the modification illustrated in Figures 5 to 9 of this application now being disclosed for the first time.

Generally speaking my invention may be defined as consisting of the combinations of elements recited in the claims hereto annexed and illustrated in the drawings accompanying and forming a part of this application, wherein: Fig. 1 represents a side elevation of a portion of a vehicle wheel having a rim made in accordance with my invention, a portion of a side of the rim being broken away to show the shape and arrangement of the parts; Fig. 2 is a cross-sectional view taken on the line 2—2 of Fig. 1; Fig. 3 is a plan view of a portion of the interior of the rim adjacent to the locking means, showing the locking means in engaged position; Fig. 4 is a perspective view of the securing latch employed with the device illustrated in Figs. 1 to 3 inclusive; Fig. 5 represents a side elevation of another type of wheel illustrating a modified form of my invention, this modification being of a type particularly adapted for use with wire spoke wheels; Fig. 6 is a plan view of a portion of the inside of the rim illustrated in Fig. 5 showing the flange securing means; Fig. 7 is a cross-sectional view showing the securing device in side elevation; Fig. 8 is a perspective view of the securing latch employed with the modification illustrated in Figs. 5 to 7 inclusive; and Fig. 9 is a face view of the bracket employed with said latch.

Describing by reference characters the parts illustrated in Figs. 1 to 4 hereof, 1 represents the felly of a wheel, which may be of wood as in the usual construction or of any other suitable material, and 2 indicates generally the metallic tire-receiving rim surrounding the same and secured in any suitable or convenient manner. In the embodiment illustrated herein, it will be seen that this rim consists of a transversely flat annular metallic member 5 having at one side the outwardly projecting flange 6, and having its opposite lateral portion depressed to form a groove 7. Surrounding the portion 5 of the rim, adjacent to the flange 6 is a loose or floating ring 8, the two sides whereof may be shaped to conform substantially to the side of the tires of two forms such as the clencher and straight wall types now most widely used. Surrounding the portion 5 of the rim adjacent to the opposite edge thereof is a removable or detachable flange 10, having a base portion 11 adapted to fit securely within the groove 7. The upper portion of this flange is preferably of greater width than the groove so as to overlie the face of the rim at both sides of the groove whereby its stability will be increased and the edge of the rim will be protected from injury due to contact with street curbs or other obstructions. The groove 7 and base portion 11 are here shown as made of symmetrical shape so as to permit the flange to be reversed with respect to the rim, the opposite faces of the projecting portion of the flange being shaped complementarily to the faces of the floating ring 8. The detachable flange is made in the form of a split ring, the closely abutting ends thereof being illustrated at 12, and the method of securing this ring about the rim will now be described.

Formed upon the inner surface of the ring 10 adjacent to each of its ends is a lug 16, the bottom of groove 7 being formed with apertures 18, 18 for the reception of these lugs. In the present embodiment these lugs are illustrated as exactly alike, although it is obvious that certain changes can be made therein without departing from the scope of my invention or changing the mode of operation of the device. The apertures 18 are also shown as separated by a web 19, the upper surface whereof forms a continuation of the bottom wall of the groove 7, although it will be obvious that in certain aspects of the invention this web can be changed in position or dispensed with without departing from the scope of my inventive idea or changing materially the operation of the device. The lugs 16—16 are located slightly rearwardly from the ends of the ring or flange 10 so as to permit the ends of the ring to be brought closely together when the lugs are seated in their apertures, and the bodies of the lugs are made substantially radial and of a size substantially to fill the apertures in which they are inserted. Furthermore the forward face of each of the lugs is formed with a forwardly projecting toe 21, here illustrated as defined by a notch 20, the toe of each lug projecting toward the toe of the opposite lug when the same are located in position and also being spaced inwardly of the inner periphery of the rim.

The rearward faces of the lugs are beveled for the major portion of their height, as illustrated at 22, for a purpose to be explained hereinafter, the portion of each lug immediately adjacent to the inner periphery of the ring being preferably abrupt, as at 23, so as to abut firmly against the end wall of the aperture in which it is inserted. For the purpose of securing these lugs in their apertures, a suitable latching device is employed which shall project simultaneously into the notches of both lugs and also engage the inner face of the rim adjacent to the apertures 18. This latch prevents the radial outward movement of the lugs, while the engagement between the shoulders 23—23 and the end walls of the apertures prevents the circumferential movement thereof relatively to the rim.

In the embodiment illustrated in Figs. 1 to 4, inclusive, this securing device comprises a latch member 25 mounted upon a pivot 26 located in the web 18, said latch member having at each side a lip 27 adapted to be inserted beneath the corresponding toe 21. This latch member also has an extended resilient handle 28 adapted to overlie one of the projections 16, the end of the handle being provided with a stud 29 adapted to spring into a recess 30 formed in the bottom wall of the groove 7. The handle is also illustrated as formed with a slot or recess 31 for the reception of a prying tool such as the blade of a screw driver or the like, whereby the same may be sprung out of engagement with the rim and turned to one side. The major portion of this handle is preferably offset slightly from the rim as shown at 32 so as to prevent the parts from corroding together at this point.

With this construction, the method of attaching or detaching the flange is obvious, the two ends being clearly removable as soon as the latch is disengaged from the projections without reference to the order in which the lugs are removed from the apertures. The lugs 16—16, apertures 18—18, and lips 27—27 being symmetrical, and the flange 7 and base 11 also symmetrical, it is obvious that the flange can be applied to the rim in either position. It will also be obvious that the particular locking or securing device I have illustrated herein may be employed independently of whether the flange, groove, base, projections, etc. are or are not symmetrical, it being merely necessary that the two lugs project through a suitable aperture or apertures in the rim and have toes on their meeting ends which may be engaged by a suitable latching member which also engages the inner face of the rim so as to prevent the lugs from being withdrawn. Therefore it will be understood that the various parts may take a great number of forms without departing from the scope of my inventive idea.

As illustrating one of the many modified forms that my invention may assume reference may be had to Figs. 5 to 9 inclusive of this application wherein I have disclosed a construction suitable more particularly to wire spoke wheels.

Describing by reference characters the construction illustrated in Figs. 5 to 9 inclusive, 40 represents an annular metallic, tire-supporting member which, in this construction, forms not only what is generally denominated the rim, but also the felly of the wheel. Formed adjacent to the edges of this annular member are outwardly opening grooves or channels 41$^a$ and 41$^b$, the bottoms whereof are formed with spaced apertures 42 for the reception of spoke nipples 43 the heads 44 whereof are contained within the grooves. The outer wall of the groove 41$^a$ is extended above the surface of the member 40 to form a flange 6$^a$, and the outer portion of the groove 41$^a$ adjacent to said flange is enlarged as indicated at 45 for the reception of an elastic, split, metallic ring 46 whereby the groove may be covered, the upper face of this ring preferably being substantially flush with the outer face of the member 40. A floating ring 8 of any suitable type such as heretofore described may be positioned upon the ring 46 and rest against the flange 6$^a$.

The outer wall of the opposite groove 41$^b$ is preferably terminated substantially flush with the face of the annular member 40 as shown at 47, and the outer portion of this groove is enlarged as at 42, as shown by dotted lines in Fig. 7. The groove 41$^b$ is preferably interrupted at one point by a web 49 the upper surface whereof is substantially flush with the outer surface of the member 40.

Surrounding the rim is a detachable flange 50 having a base portion 51 shaped complementarily to the enlargement 48 of the groove 41$^b$ so as to fit snugly therein, the projecting portion of the flange being shaped complementarily to the floating ring 8. The base portion 51 of this flange terminates at each side of the web 49, the outer portion of the flange continuing therebeyond at each end so as substantially to abut as shown at 52.

The bottom wall of the groove 41$^b$ is apertured below and at each side of the web 49 as shown at 53, and carried by the flange 50 adjacent to each end thereof is an inwardly projecting lug 55 having its rearward side beveled at 56 and having its forward end formed with a forwardly projecting toe 57. The ends of the aperture 53 are illustrated as beveled at 54 complementarily to the rearward ends of the lugs. The maximum length of each of these lugs is not greater than the space between the end of the aperture 53 and the adjacent corner of the web 49, whereby these lugs may spring inwardly to their respective apertures when the flange is positioned upon the ring. Likewise the normal interior diameter of the flange base is preferably not greater than the exterior diameter of its seat, whereby the elasticity of the flange may tend to constrict it upon the rim and thereby bring the ends 52 thereof together by reason of the wedging of the projections 55—55 against the end of the aperture. The toes 57—57 are designed to be spaced a short distance beneath the web 49 when the flange is fully seated.

Secured to the inner face of the member 40 is a bracket 60, having a slot 61, receiving a threaded bolt 62, said bolt having a head 63 at one side of the bracket and a collar 64 at the opposite side of the bracket, whereby its longitudinal movement may be prevented without impeding its rotation. This bolt is preferably mounted substantially transverse to the rim as shown in Figs. 5, 6, and 7 and substantially in alinement with the web 49. The portion of the slot 61 adjacent to the body of the rim is preferably enlarged as at 65 for the reception of a reciprocable latch 66. This latch has at its rearward end a right angular extension 67 apertured and threaded for engagement with the bolt 62, and has its forward end projecting parallel with and adjacent to the web 49 in such wise that when the bolt is rotated in one direction the latch will be projected between the web 49 and the toes 57—57 thereby preventing the withdrawal of the lugs 55—55 from the aperture in which they are inserted. The wall of the groove 41$^b$ adjacent to the bracket 16 may be notched or cut away as at 70 for the reception of this latch, while the disengagement of the latch and bolt may be prevented by means of a removable collar or washer 71 secured to the rearward end of the bolt. The latch is so designed that when fully projected into engaging position the face of the extension 67 will be wedged against the face of the collar 64, thus preventing the bolt from being rotated accidentally. It will be seen that the springing of the lugs into place, and the further wedging action of the latch 66 against the toes 57—57 will draw the ends of the flange together without any rotation or slipping of the flange relatively to its seat.

While I have illustrated and described the last modification of the device in connection with a wire spoke wheel I do not confine myself solely to this use, although I apprehend that it will find its greatest use in this connection. Likewise I do not imply that it is impossible to employ the first modification of this invention with a wire spoke wheel, since such is not the case. Therefore it will be understood that, while I have necessarily described my invention in detail and pointed out two widely differing constructions wherein the same may be embodied, I do not propose to limit myself to such details or to such constructions, except as the same may be specifically recited in the claims hereto annexed or may be rendered necessary by the prior state of the art.

Having thus described my invention, what I claim is:

1. The combination with a tire-supporting rim; of a transversely split ring detachably fitted to said rim and provided with inwardly directed lugs adjacent its respective ends, said rim being interrupted at one point in its circumference to permit such lugs to project therethrough; a forwardly projecting toe on each of said lugs; and a securing member carried by said rim and adapted to engage the toes of both said lugs and thereby lock said ring in place.

2. The combination with a tire-supporting rim; of a transversely split ring detachably fitted to said rim and provided with inwardly directed lugs adjacent its respective ends, said rim being interrupted at one point in its circumference to permit such lugs to project therethrough; a toe upon the side of each of said lugs nearest the corresponding end of said ring; and a securing member movably attached to said rim and adapted in one position to engage the toes of both said lugs and thereby lock said ring in place.

3. The combination with a tire-supporting rim having a pair of radial apertures separated by a web; of a transversely split ring detachably fitted to said rim and provided with lugs adjacent its respective ends adapted to project through such apertures; a forwardly projecting toe on each of said lugs; and a securing member adapted to be inserted between such web and said toes and thereby lock said ring in place.

4. The combination with a tire-supporting rim having a pair of radial apertures separated by a web; of a transversely split ring detachably fitted to said rim and provided with lugs adjacent its respective ends adapted to project through such apertures; a toe upon the side of each of said lugs nearest the corresponding end of said ring; and a securing member movably attached to said rim and adapted in one position to extend between such web and said toes and thereby lock said ring in place.

5. The combination with a tire-supporting rim; of a transversely split ring detachably fitted to said rim and provided with inwardly directed lugs adjacent its respective ends, said rim being interrupted at one point in its circumference to permit such lugs to project therethrough; a forwardly projecting toe on each of said lugs; a securing member carried by said rim and adapted to engage the toes of both of said lugs and thereby lock said ring in place; and means adapted to retain said member in such engaging position.

6. The combination with a tire-supporting rim having a pair of radial apertures separated by a web; of a transversely split ring detachably fitted to said rim and provided with lugs adjacent its respective ends adapted to project through such apertures; a toe upon the side of each of said lugs nearest the corresponding end of said ring; a securing member movably attached to said rim and adapted in one position to extend between such web and said toes and thereby lock said ring in place; and means adapted to retain said member in such locking position.

7. The combination with a tire-supporting rim; of a transversely split ring detachably fitted to said rim and provided with inwardly directed lugs adjacent its respective ends, said rim being interrupted at one point in its circumference to permit such lugs to project therethrough; a forwardly projecting toe on each of said lugs, the rearward faces of said lugs being beveled; and a securing member carried by said rim and adapted to have wedging engagement with the toes of both said lugs and thereby draw the latter radially inward, the beveled faces of said lugs thereupon engaging said rim to force the ends of said ring together.

8. The combination with a tire-supporting rim having a pair of radial apertures separated by a web; of a transversely split ring detachably fitted to said rim and provided with lugs adjacent its respective ends adapted to project through such apertures; a forwardly projecting toe on each of said lugs, the rearward faces of said lugs being beveled; and a securing member adapted to be inserted between such web and said toes, said member being of wedge form whereby said lugs are drawn radially inward and the beveled faces of the latter thereupon engaging the apertures in said rim to force the ends of said ring together.

9. The combination with a tire-supporting rim; of the transversely split ring detachably fitted to said rim and provided with inwardly directed lugs adjacent its respective ends, said rim being interrupted at one point in its circumference to permit such lugs to project therethrough; a forwardly projecting toe on each of said lugs; and a transversely adjustable securing member carried by said rim and adapted in one position to engage the toes of both said lugs and thereby lock said ring in place.

10. The combination with a tire-supporting rim; of a transversely split ring detachably fitted to said rim and provided with inwardly directed lugs adjacent its respective ends, said rim being interrupted at one point in its circumference to permit such lugs to project therethrough; a forwardly projecting toe on each of said lugs; and a transversely reciprocable latch carried by said rim and adapted in one position to engage the toes of both said lugs and thereby lock said ring in place.

11. The combination with a tire-supporting rim; of a transversely split ring detachably fitted to said rim and provided with inwardly directed lugs adjacent its respective ends, said rim being interrupted at one point in its circumference to permit such lugs to project therethrough; a forwardly projecting toe on each of said lugs; a transversely reciprocable latch carried by said rim and adapted in one position to engage the toes of both said lugs and thereby lock said ring in place; and means adapted to positively reciprocate said latch in both directions.

12. The combination with a tire-supporting rim; of a transversely split ring detachably fitted to said rim and provided with inwardly directed lugs adjacent its respective ends, said rim being interrupted at one point in its circumference to permit such lugs to project therethrough; a forwardly projecting toe on each of said lugs; a transversely reciprocable latch carried by said rim and adapted in one position to engage the toes of both said lugs and thereby lock said ring in place; a screw adapted to reciprocate said latch in both directions; and means adapted to retain said screw against rotation in such engaging position of said latch.

13. The combination with a tire-supporting rim; of a transversely split ring detachably fitted to said rim and provided with inwardly directed lugs adjacent its respective ends, said rim being interrupted at one point in its circumference to permit such lugs to project therethrough; a forwardly projecting toe on each of said lugs, the rearward faces of said lugs being beveled; and a transversely reciprocable latch carried by said rim and adapted in one position to have wedging engagement with the toes on both said lugs and thereby draw the latter radially inward, the beveled faces of said lugs thereupon engaging said rim to force the ends of said ring together.

14. The combination with a tire-supporting rim having a pair of radial apertures separated by a web; of a transversely split ring detachably fitted to said rim and provided with lugs adjacent its respective ends adapted to project through such apertures; a forwardly projecting toe on each of said lugs, the rearward faces of said lugs being beveled; a transversely reciprocable latch carried by said rim and adapted to be inserted between such web and said toes, said latch having a wedge-shaped end, whereby said lugs are drawn radially inward and the beveled faces of said lugs thereupon engaging the apertures in said rim to force the ends of said ring together; and means adapted to positively reciprocate said latch in both directions.

15. The combination with a tire-supporting rim having a pair of radial apertures separated by a web; of a transversely split ring detachably fitted to said rim and provided with lugs adjacent its respective ends adapted to project through such apertures; a forwardly projecting toe on each of said lugs, the rearward faces of said lugs being beveled; a transversely reciprocable latch carried by said rim and adapted to be inserted between such web and said toes, said latch having a wedge-shaped end, whereby said lugs are drawn radially inward and the beveled faces of said lugs thereupon engaging the apertures in said rim to force the ends of said ring together; a screw adapted to reciprocate said latch in both directions; and means adapted to retain said screw against rotation in such engaging position of said latch.

In testimony whereof I hereunto affix my signature in the presence of two witnesses.

RICHARD S. BRYANT.

Witnesses:
HAROLD E. SMITH,
BRENNAN B. WEST.